United States Patent
Liang et al.

(10) Patent No.: US 6,631,220 B1
(45) Date of Patent: Oct. 7, 2003

(54) OPTICAL ISOLATOR

(75) Inventors: Hwa-Tse (Roger) Liang, Fremont, CA (US); Siyu (Frank) Shen, San Leandro, CA (US); Hua (Philip) Guo, Redwood City, CA (US)

(73) Assignee: OptiWork, Inc., Fremont, CA (US)

( * ) Notice: Subject to any disclaimer, the term of this patent is extended or adjusted under 35 U.S.C. 154(b) by 0 days.

(21) Appl. No.: 09/611,935

(22) Filed: Jul. 7, 2000

(51) Int. Cl.⁷ .................................................. G02B 6/27
(52) U.S. Cl. ........................................... 385/11; 385/34
(58) Field of Search ................................. 385/11, 15, 27, 385/34, 31, 33

(56) References Cited

U.S. PATENT DOCUMENTS

| | | | |
|---|---|---|---|
| 4,178,073 A | 12/1979 | Uchida et al. | 350/151 |
| 4,375,910 A | 3/1983 | Seki | 350/375 |
| 4,756,607 A | 7/1988 | Watanabe et al. | 350/375 |
| 5,208,876 A | 5/1993 | Pan | 385/11 |
| 5,317,655 A | 5/1994 | Pan | 385/11 |
| 5,446,813 A * | 8/1995 | Lee et al. | 385/31 |
| 5,566,259 A | 10/1996 | Pan et al. | 385/11 |
| 5,661,829 A | 8/1997 | Zheng | 385/33 |
| 5,734,762 A | 3/1998 | Ho et al. | 385/11 |
| 6,023,542 A * | 2/2000 | Pan et al. | 385/24 |
| 6,343,166 B1 * | 1/2002 | Hellman et al. | 385/31 |

* cited by examiner

Primary Examiner—Rodney Bovernick
Assistant Examiner—Sarah U Song
(74) Attorney, Agent, or Firm—Foley & Lardner (57) ABSTRACT

An improved optical isolator having a pre-aligned first and second collimator and a pre-aligned core assembly joined with the first collimator, the first and second collimators and core assembly all disposed within a housing tube. The core assembly is aligned with and joined directly to the first collimator and fits snugly within the housing tube. The second collimator fits within the housing tube such that it can be aligned with core assembly to minimize insertion loss. The first and second collimators are connected to the housing tube by solder joints, at least one of which is made from a low temperature solder. The core assembly includes a cylindrical permanent magnet, a pair of birefringent wedges and an optical rotator. The optical rotator is joined to a wedge on either side and the combined structure is affixed to the cylindrical permanent magnet. The collimators include a glass ferrule for connecting to a optical fiber and a GRIN lens for collimating the light from the optical fiber onto the core assembly. The collimators are pre-aligned in the manufacturing process to minimize insertion loss and the core assembly is also pre-aligned before being joined to the first collimator. The final adjustment is made by aligning the second collimator within the housing tube to the core assembly. The resulting optical isolator has a smaller length and diameter, higher reliability and better manufacturing yields.

18 Claims, 6 Drawing Sheets

OPTICAL ISOLATOR

CROSS-REFERENCE TO RELATED APPLICATIONS

BACKGROUND OF THE INVENTION

1. Field of the Invention

The present invention relates generally to the field of optical isolators and more particularly to the cost, size reduction, and improved manufacturability of optical isolators.

2. Brief Description of Related Art

Typical optical isolators include a pair of collimating elements, such as GRIN (graduated index) lenses at the input and output ports of the device, and a core assembly located between the pair of collimating elements. The core assembly is made up of a pair of optically birefringent devices disposed on either side of an optically active device, such as a Faraday rotator.

Figure 1:
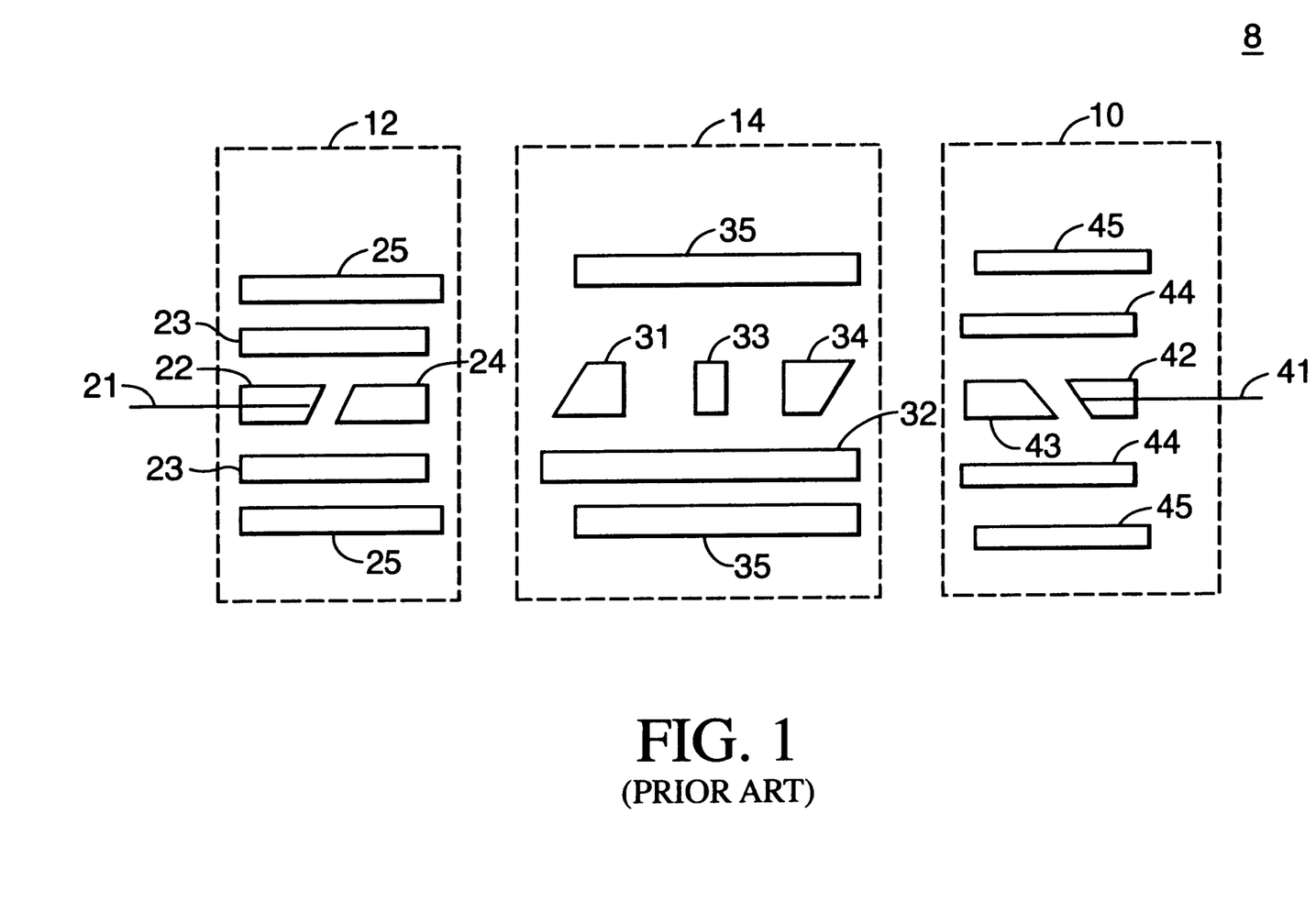
FIG. 1 shows a typical prior art optical isolator.

FIG. 1 shows the structure of a typical optical isolator 8. Collimating elements 10 and 12 include metal collimator holders 25, 45, in which quartz collimator aligners 23 and 44 are positioned. Glass ferrules 22, 42 for holding optical fibers 21, 41, respectively and GRIN (graduated index of refraction) lenses 24, 43 are disposed within the quartz aligners 23, 44. GRIN lenses 24, 43 act to collimate the light rays entering the device and to focus any light rays leaving the device.

The core assembly 14 includes a cylindrical permanent magnet 35, birefringent wedges 31, 34 and a rotator 33, which is commonly made of yttrium iron garnet (YIG). The cylindrical permanent magnetic 35 generates a magnetic field for YIG rotator 33. Birefringent wedges 31 and 34 separate incident light into two orthogonal rays that are parallel and perpendicular to the optical axis of each wedge and wedge 34 has its optical axis rotated relative to the optical axis of wedge 31. The rotator 33 and birefringent wedges 31, 34 are held in place within the magnetic cylinder 35 by rotator holder 32.

There are two directions of operation, the forward direction in which light from fiber 21 enters the device and the reverse direction in which light from fiber 41 enters the device or reflections from light propagating in a forward direction enters the device.

Figure 2A:
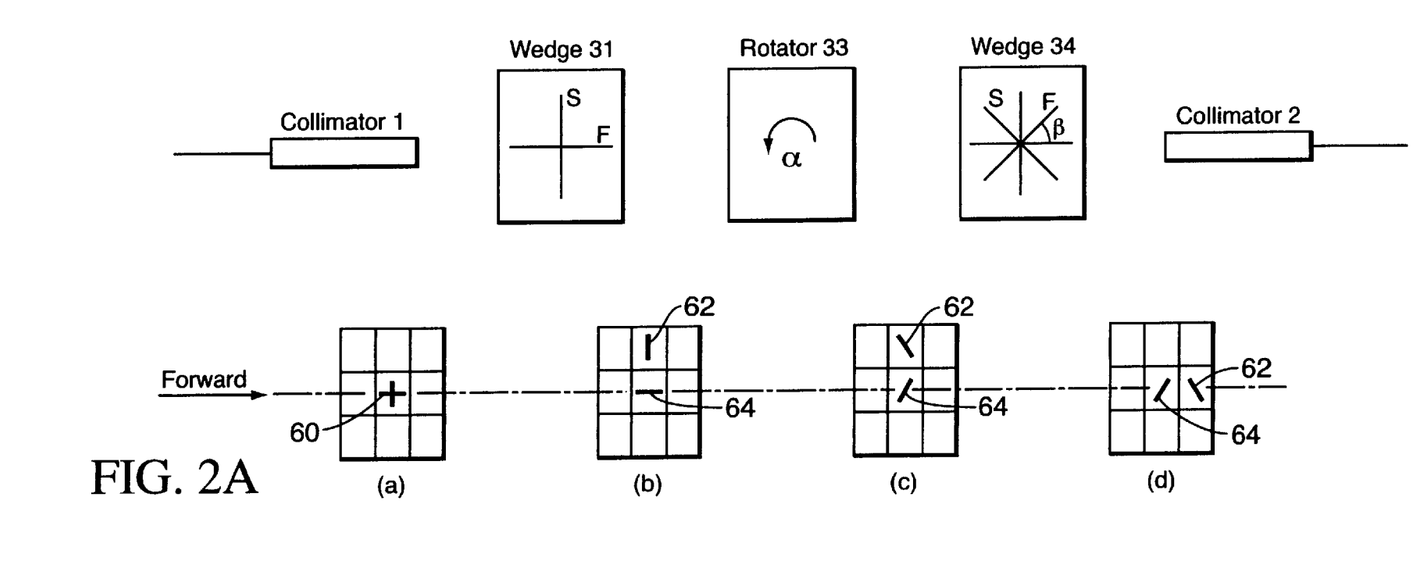
FIGS. 2A and 2B show a series of diagrams that set forth the operation of an isolator.

Referring to FIG. 2A, in the forward direction of operation, light 60 from fiber 21, diagram (a), enters the GRIN lens 24 and is collimated onto birefringent wedge 31. The wedge 31 has two axes, a fast axis (a smaller index of refraction $n_F$) and a slow axis (a larger index of refraction $n_s$), that are orthogonal to each other. To simply the discussion, assume the fast axis is the horizontal and the slow axis is vertical, as shown. (In an actual implementation, the fast axis and slow axis can have a different angle with respect to the horizontal and vertical axes respectively.) Thus, regardless of the polarization of the input light, wedge 31 causes light emerging from the wedge to have a fast-axis component 64 and a slow-axis component 62, each component being refracted differently by the wedge 31, as shown in diagram (b) of FIG. 2A. This light is then processed by the optical rotator 33, which rotates the plane of polarization of both components in space by some angle $\alpha$, which depends on the thickness of the rotator 33. This is shown in diagram (c) of FIG. 2A. A typical rotation angle is 45 degrees. The spatially rotated components then impinge on wedge 34, which has its fast and slow axes rotated by an angle $\beta$. If $\beta$ is the same angle as $\alpha$, the fast component of the light beam is aligned with the fast axis of the wedge 34 and the slow component is aligned with the slow axis of the wedge 34. Because of this alignment, the light is refracted through wedge 34 without loss (ideally) to produce a collimated beam, as shown in diagram (d), that is focused by the GRIN lens 43 and accepted into the aperture of the fiber 41.

Figure 2B:
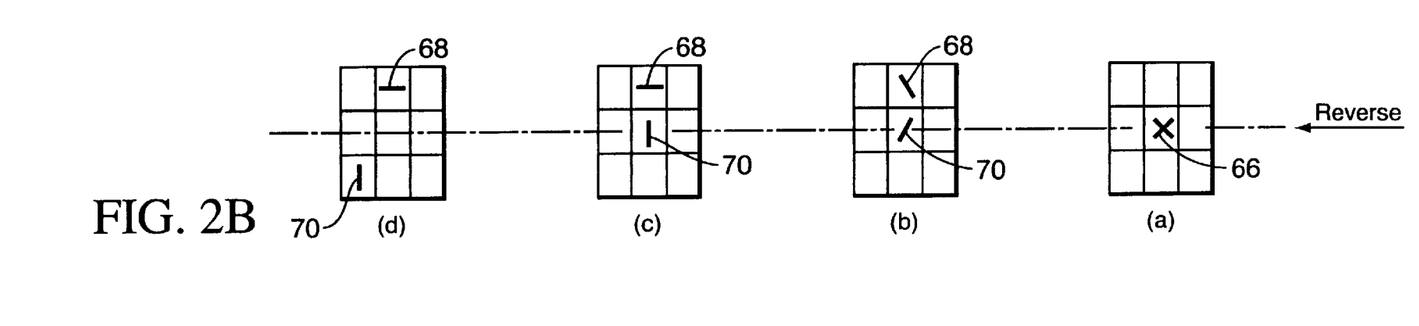

Referring to FIG. 2B, in the reverse direction of operation, light of arbitrary polarization 66 from fiber 41 or reflected light from a forward traveling wave enters the device and is collimated by GRIN lens 43 so that substantially parallel rays impinge upon wedge 34. Wedge 34, like wedge 31, has a fast axis and a slow axis, the axes rotated by the angle $\beta$, as described above. Light passing in the reverse direction through wedge 34 now has fast component 70 and slow component 68 in diagram (b) of FIG. 2B, orthogonal to each other and aligned with the rotated axes of wedge 34. Next, the light beam passes, in the reverse direction, through the optical rotator 33, which, being a non-reciprocal device, rotates the planes of polarization, shown in diagram (c), by an angle a in the same direction as the rotation in the forward direction of travel. This rotation causes the components, 70, 68 of the light to be aligned with the vertical and horizontal axes. Light from the rotator is next processed by wedge 31 which has a horizontal fast axis and a slow vertical axis. However, because of the initial alignment of wedge 34 and the rotation of optical rotator 33, the slow component 68 from wedge 34 is aligned with the fast axis of wedge 31 and the fast component 70 from wedge 34 is aligned with the slow axis of wedge 31. The light beam is refracted by the wedge 31, according to this alignment, causing a pair of divergent beams to emerge from the wedge, as shown in diagram (d) of FIG. 2B. The divergent beams cannot be focused onto the aperture of the optical fiber 21 and the reverse-direction light is thus blocked from entering the fiber 21.

Current optical isolators, such as the one in FIG. 1, have lengths in the range of 40 mm to 42 mm and outer diameters in the range of 5.3 to 5.5 mm. These dimensions result from an internal structure of the isolator and its packaging in order to meet the optical performance, reliability and manufacturability requirements placed on the isolator.

A measure of the optical performance of an optical isolator is the ratio of the insertion loss to the isolation, where the insertion loss is the reduction in intensity of the signal in the forward direction of propagation through the isolator and isolation is the reduction in intensity of a the signal in the reverse direction through the isolator. Ideally, the manufacture of the isolator is such as to minimize the insertion loss and maximize the isolation. To achieve this goal, the internal structure of the isolator must allow fine alignment adjustments of the collimators. Alignment of the isolator of FIG. 1 is accomplished by quartz collimator aligners 23 and 44. These components increase the outer diameter of the isolator of FIG. 1.

Reliability is measured by the ability of the isolator to withstand certain environmental stresses such as temperature, humidity and vibration without a significant impact on the optical performance, i.e., the insertion loss and isolation ratio, of the isolator. In part, reliability is enhanced by an outer protective cover surrounding the holder 25 and cylindrical magnet 35.

Finally, the manufacturability of the isolator is gauged by the manufacturing yield of isolators with good to superior optical performance characteristics. High yields of high performance devices translates into lower costs than with poor yields of high performance devices. An optical isolator may, in theory, be capable of superior performance that is not achievable in practice because the manufacturing process steps adversely affect the theoretical performance. An example of this is the use of high temperature solders to hold the collimating elements of the isolator in place. These solders can have a permanent and serious effect on the performance of the isolator by affecting the alignment of the collimating elements. This causes in irreparable loss in the performance of the isolator.

There is currently a demand for smaller and lower cost optical components such as optical isolators to reduce the overall size and cost of equipment using such components. However, reducing the size of an optical isolator precludes the use of currently available structures to meet the above-mentioned optical performance, reliability and manufacturability requirements placed on these components.

Thus, there is a need for a smaller and lower cost optical isolator component that meets or exceeds the performance, reliability and manufacturability requirements of current components.

SUMMARY OF INVENTION

The present invention is directed towards the above need. An apparatus in accordance with the present invention includes a housing tube, a first and second collimator, each of which is affixed within the housing tube to receive and collimate light signals from an optical fiber connected to each collimator and an optically isolating core assembly which also resides within the housing tube between the two collimators. The core assembly is joined directly to one of the collimators while the other collimator is alignable to the core assembly. Each of the collimators and the core assembly are pre-aligned to minimize insertion loss. The core assembly includes a cylindrical permanent magnet within which reside a pair of birefringent wedges and an optical rotator disposed between and joined on either side to the wedges. Each collimator includes a glass ferrule for holding an optical fiber and a GRIN lens for collimating light received from the optical fiber. Each collimator is affixed to the housing tube by means of solder joints and the alignable collimator is adjustable for alignment by means of these solder joints.

A method in accordance with the present invention includes the steps of providing an aligned first collimator and second collimator and an aligned core assembly. The core assembly is then joined to the first collimator and aligned to the first collimator to minimize insertion loss Then the first and second collimators are affixed within a housing tube and the second collimator is adjusted to be in alignment with the core assembly.

An advantage of the present invention is that the optical isolator is smaller in length because of the construction of the core assembly and small in diameter because of the construction of the collimators.

Another advantage of the present invention is that the optical isolator has improved optical performance because each of the elements is pre-aligned before assembly into the housing tube with the only adjustment required being that of the second collimator to the core assembly.

Another advantage is improved reliability because each element is pre-aligned and there is only a single element that needs alignment at final assembly.

Another advantage is improved manufacturability because only elements that have low insertion loss are assembled into a final unit with only one adjustment being made at final assembly, that of aligning the second collimator to the core assembly. This guarantees an improved yield of high quality devices.

BRIEF DESCRIPTION OF DRAWINGS

These and other features, aspects and advantages of the present invention will become better understood with regard to the following description, appended claims, and accompanying drawings where:

DESCRIPTION OF THE PREFERRED EMBODIMENTS

Figure 3:
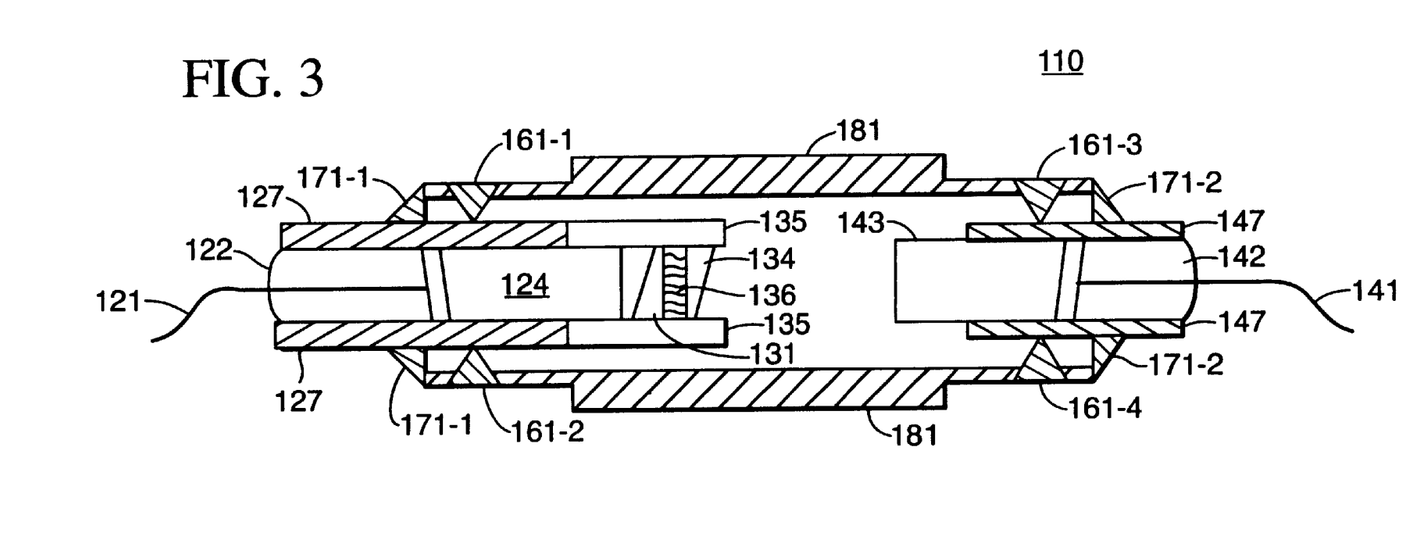
FIG. 3 shows a cross-section of an embodiment of an optical isolator in accordance with the present invention.

FIG. 3 shows a cross-sectional view of an embodiment of an optical isolator 110 in accordance with the present invention. Housed within a gold-coated stainless-steel housing tube 181, are gold-coated stainless-steel collimator holders 127 and 147 and cylindrical permanent magnet 135. In one version of the present invention, housing tube is cylindrical with a length in the range of about 18 to 19 mm, an inner diameter in the range of 3.0 to 3.2 mm and an outer diameter in the range of about 4.3 to 4.4 mm.

Collimator holder 127 is affixed to steel housing tube 181 preferably by four solder joints 161-1, 161-2, 161-5, and 161-6, although a different number of solder joints could be used. The position of these solder joints is chosen to be midway along the length of the collimator holder 127. Solder joints 161-1, 161-2, 161-5 (positioned on the collimator holder 127 midway between and in a plane orthogonal to the plane of 161-1 and 161-2 and not shown), and 161-6 (opposing 161-5 and not shown) are used to adjust the alignment of the collimator 127 and to seal the interior of the isolator from the outside environment. An additional annular joint 171 -1 is made between a portion of the collimator 127 protruding from the housing tube and the housing tube 181 to further improve the mechanical stability of collimator holder 127 and to further seal the interior of the isolator. Preferably, collimator holder 127 is cylindrical, is made from stainless steel and has 50 micro-inches of gold plating over the outer cylindrical surface.

Collimator holder 147 is affixed to steel housing tube 181 by four solder joints 161-3, 161-4, 161-7 and 161-8. The position of these solder joints is chosen to be midway along the length of the collimator holder 147. Solder joints 161-3, 161-4, 161-7 (positioned on the collimator holder, 147 midway between and in a plane orthogonal to the plane of 161-3 and 161-4 and not shown), and 161-8 (opposing 161-7 and not shown) are used to adjust the alignment of the collimator 147 and to seal the interior of the isolator from the outside environment. An additional annular joint 171-2 is made between a portion of the collimator 147 protruding from the housing tube 181 and the housing tube 181 to further improve the mechanical stability of collimator holder 147 and to further seal the isolator 110. Preferably, collimator holder 147 is cylindrical, is made from stainless steel and has 50 micro-inches of gold plating over the outer cylindrical surface.

To reduce the thermal influence on the alignment during soldering, solders having different melting points are used. For the first three joints, 161-1, 161-2, 161-5 and 161-3, 1614, 161-7 for each collimator, a higher temperature solder is used whereas for the fourth joints, 161-6 and 161-8 a lower temperature solder is used. Preferably, contact time of the soldering iron and the house tube should be as short as possible and the solder amount should be effectively controlled to avoid damage of the alignment collimator during the soldering operation.

Figure 4:
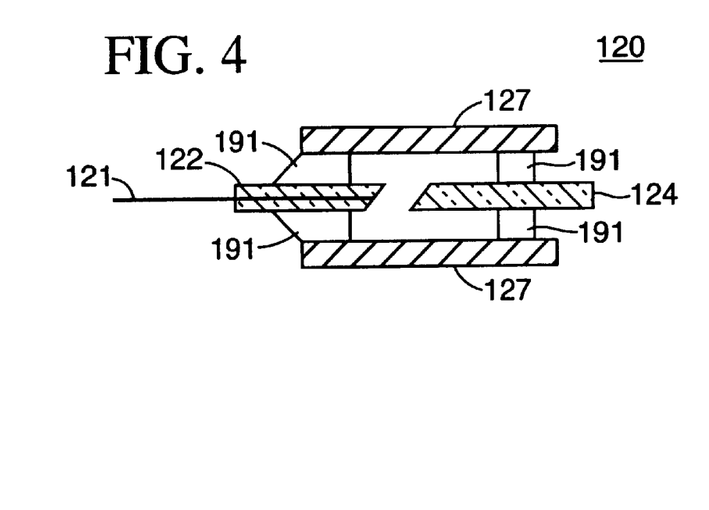
FIG. 4 shows a cross-section of a collimator of the present invention in more detail.

FIG. 4 shows a cross-section for a collimator structure 120 in accordance with the present invention. Collimator holder 127 has disposed within it glass ferrule 122 which holds optical fiber 121 and GRIN lens 124, which is aligned with the glass ferrule 122 and protrudes out of the holder. Preferably, glass ferrule has a length of about 5 mm and an outer diameter of about 1.8 mm. Adhesive 191 holds both the GRIN lens and the glass ferrule 122 in an aligned position within the holder 127. Preferably, collimator holder 127 has a length of approximately 8 mm, an outer diameter of about 3 mm and an inner diameter of about 1.8 mm. Thus, collimator holder 127 fits snugly within housing tube. Similarly, collimator holder 147 has disposed within it glass ferrule 142, which holds optical fiber 141 and GRIN lens 143, which is aligned with the glass ferrule 142. Preferably, collimator holder 147 has an outer diameter that is smaller than the inner diameter of the housing tube to permit adjustment of the collimator within the housing tube. In one version of the invention, collimator holder 147 has an approximate length of 8 mm, an approximate outer diameter of 2.5 mm and an inner diameter of about 1.8 mm.

Figure 5:
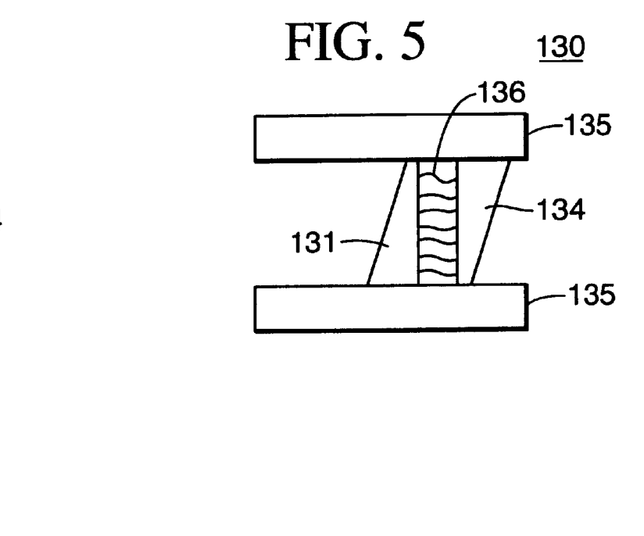
FIG. 5 shows a cross-section of a core assembly of the present invention in more detail.

FIG. 5 shows a cross-section of the core assembly 130 in accordance with the present invention. Core assembly includes first birefringent wedge 131, Faraday rotator 136, and second birefringent wedge 134, all disposed within cylindrical permanent magnet 135. Faraday rotator 136 is positioned between the wedges 131 and 134 and the three components are placed in an alignment fixture and bonded together by applying an adhesive along the outside edges of the components. This three-component stack is then assembled into the cylindrical magnet and held in place within the cylinder with a thermal adhesive such as epoxy, which is not yet cured. Next, the core assembly is place in a fixture having an aligned set of collimators and lenses and the three-component stack is then aligned within the cylinder for optimal performance. Finally, epoxy is cured to hold the stack in place inside the cylinder. The result is a core component that has optimal insertion loss and isolation characteristics.

Figure 6:
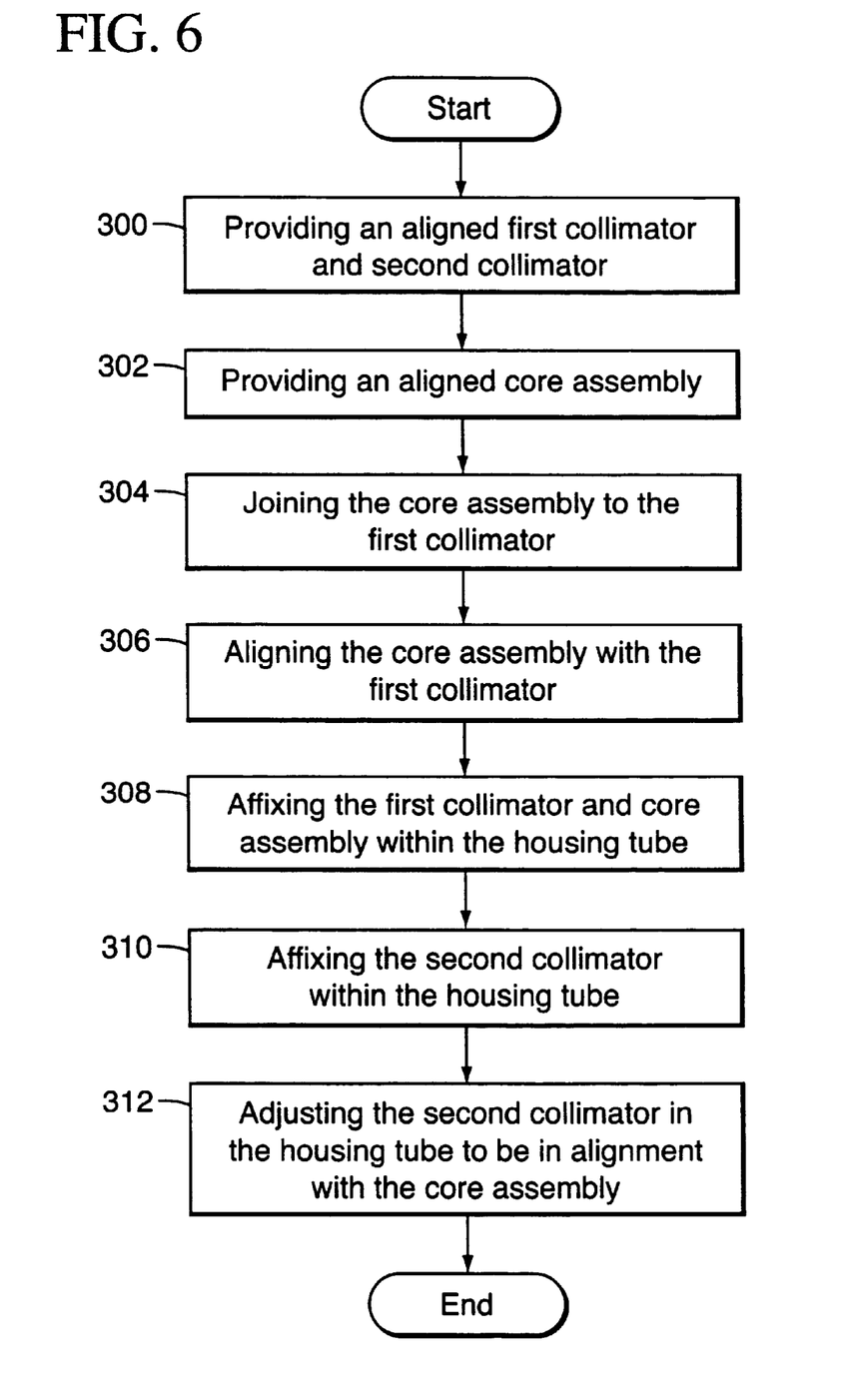
FIG. 6 shows a flow chart of the assembly process for an optical isolator in accordance with the present invention.

FIG. 6 shows a flow chart of the assembly process for an optical isolator in accordance with the present invention. In step 300, aligned first and second collimators are obtained. Next, in step 302, an aligned core assembly is obtained and in step 304 the core assembly is joined to the aligned first collimator. When the aligned collimator is joined to the core, a portion of GRIN lens protrudes past the joint and into the core. Once joined, the first collimator and core assembly are aligned, in step 306 to each other to minimize insertion loss. Next, in step 308, the first collimator and core assembly are affixed within the housing tube by means of solder joints as described above. Finally, in step 310, the second collimator is affixed to the housing tube and adjusted to be in alignment, in step 312, with the core assembly.

Figure 7A:
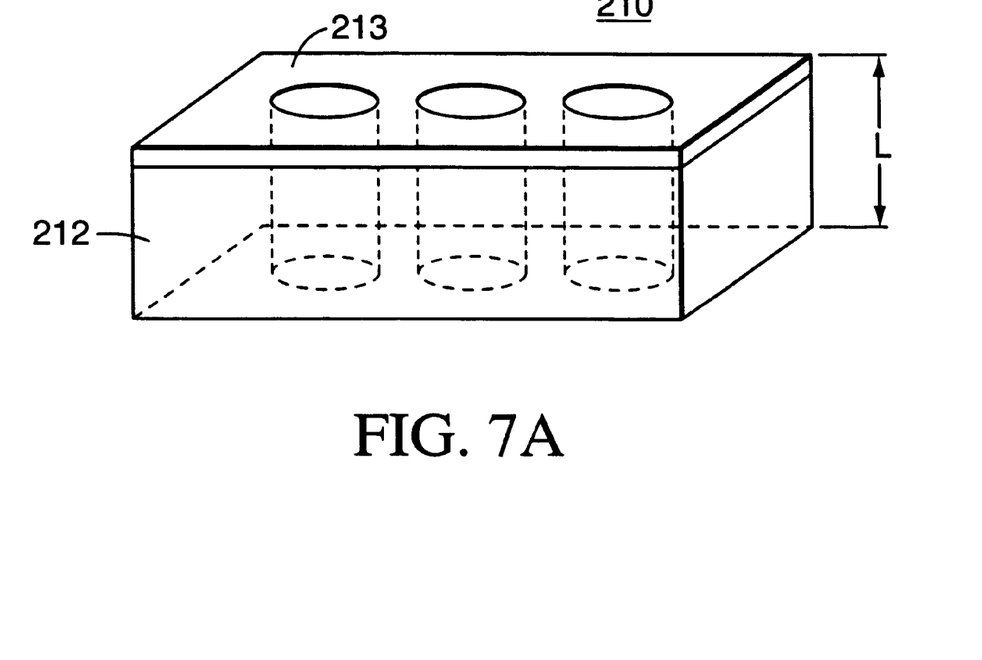
FIGS. 7A and 7B show a fixture, in accordance with the present invention, for assembling a collimator.
Figure 7B:
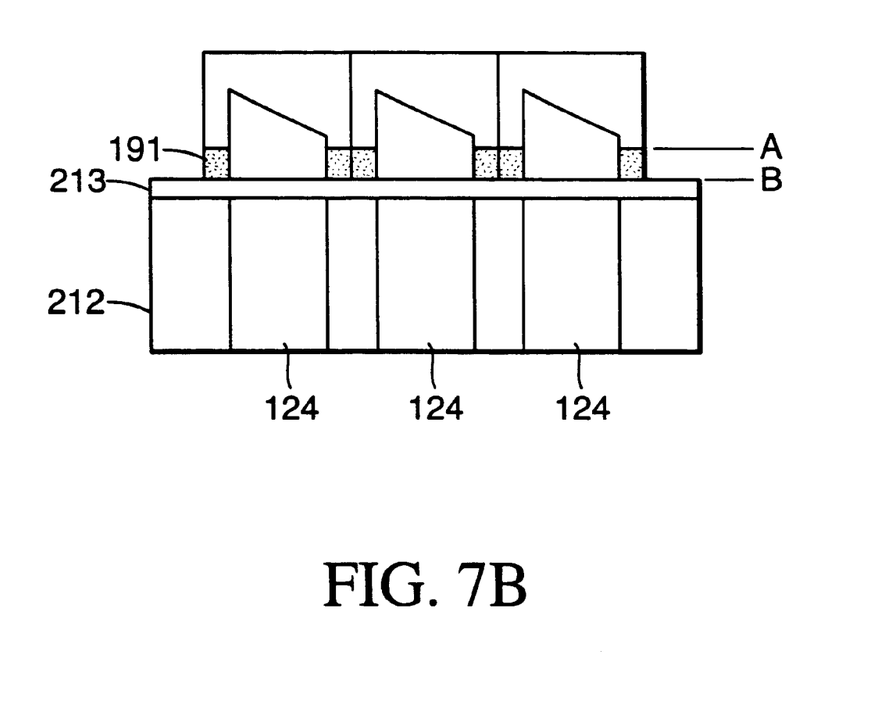
Figure 8:
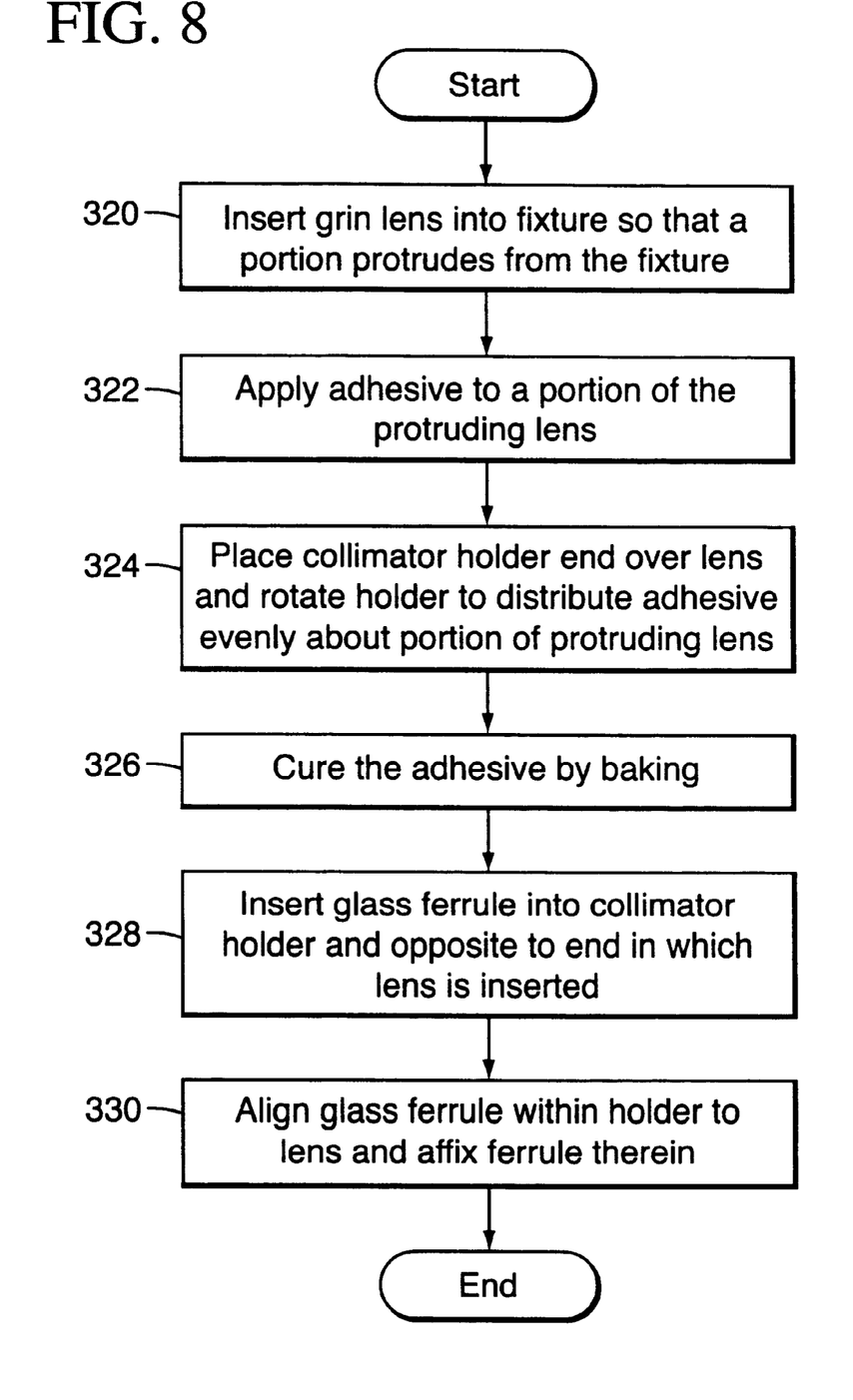
FIG. 8 shows a flow chart of the assembly process in accordance with the present invention, for a collimator.

FIGS. 7A and 7B show the detail of a fixture for assembling a collimator and FIG. 8 shows a flow chart of the steps involved. First, in step 320, one or more GRIN lenses 124 are inserted into stack 210. Stack 210 has two layers, layer 212 is the flat bottom and layer 213 has holes with diameters that fit the outer diameter of the GRIN lens. An adhesive 191, in step 322, is spread evenly around the GRIN lens between positions A and B along the length of the GRIN lens and portion L is left protruding from the stack 210 for attaching to the core. A collimator holder 127 is then placed over the GRIN lens and turned around the axis of the GRIN lens, in step 324, so that the adhesive 191 fills the space between the GRIN lens 124 and holder 127 between the A and B points. The adhesive is then cured by baking in step 326. Next, a glass ferrule is inserted into the collimator holder in step 328, the angle is adjusted to minimize the insertion loss and the ferrule is affixed in place in step 330. Thus, the collimators, in accordance with the present invention, are pre-aligned to minimize insertion loss between the optical fiber and the GRIN lens.

A device constructed in accordance with the present invention, thus, has no quartz aligner for the collimators. Instead, the collimator holders are bonded directly to the housing tube. Also there is no core holder for the core elements. The core elements are instead bonded directly to each other and to the permanent magnet. These changes, along with alignment during soldering, help to produce an isolator having a smaller size, improved optical characteristics, better reliability and improved manufacturability. Specifically, in one embodiment in accordance with the present invention, the length of the isolator is reduced to be within the approximate range of 27–30 mm and the outer diameter in the approximate range of 4.0 to 4.3 mm. In this embodiment, an isolator can achieve an insertion loss of about 0.27 dB+-10%, a return loss greater than about 65 dB, a polarization-dependent loss less than about 0.05 dB, an isolation greater than about 48 dB at the center wavelength of the device, and a bandwidth of about+-15 nanometers about the center wavelength. Manufacturing yields can be in the range of about 90–95% for device having these characteristics.

Although the present invention has been described in considerable detail with reference to certain preferred versions thereof, other versions are possible. Therefore, the spirit and scope of the appended claims should not be limited to the description of the preferred versions contained herein.

What is claimed is:

1. An optical isolator comprising:
   a housing tube;
   a first glass ferrule for holding a first optical fiber;
   a first GRIN lens in alignment with the first glass ferrule to receive and collimate a first optical signal from the first optical fiber;
   a first collimator holder affixed within the housing tube, the first holder having the first glass ferrule and first GRIN lens disposed within;
   a second glass ferrule for holding a second optical fiber;
   a second GRIN lens in alignment with the second glass ferrule to receive and collimate a second optical signal from the second optical fiber;
   a second collimator holder affixed within the housing tube, the second holder having the second glass ferrule and second GRIN lens disposed within;

a first birefringent wedge in alignment with the first GRIN lens to receive a collimated light signal therefrom;

a second birefringent wedge in alignment with the second GRIN lens to receive a collimated light signal therefrom, the second wedge having an optical axis rotated a predetermined angle with respect to an optical axis of the first wedge;

an optical rotator in alignment with the first and second wedges to receive light signals having orthogonal planes of polarization from the wedges, the optical rotator for rotating the planes of polarization of the light signals passing through the rotator and configured to have an angle of rotation that matches the predetermined angle of rotation of the optical axis of the second wedge; and a cylindrical permanent magnet for providing a magnetic field to the optical rotator, the magnet being joined at one end directly to an end of the first collimator holder and having the first and second birefringent wedges and optical rotator disposed within.

2. An optical isolator as recited in claim 1, wherein the housing tube is made of stainless steel.

3. An optical isolator as recited in claim 2, wherein the stainless steel housing tube is coated with a layer of nickel-gold alloy.

4. An optical isolator as recited in claim 1, wherein the optical rotator has a first face that receives light from the first wedge and a second face that receives light from the second wedge; and wherein the first wedge is joined to the first face of the optical rotator and the second wedge is joined to the second face of the optical rotator.

5. An optical isolator as recited in claim 1, wherein the collimator holders are made of stainless-steel.

6. An optical isolator as recited in claim 5, wherein the stainless-steel collimator holders are coated with a layer of gold.

7. An optical isolator as recited in claim 1, wherein the first and second collimator holders are affixed within the housing tube by solder joints.

8. An optical isolator as recited in claim 7, wherein the solder joints connect between the housing tube and the first and second collimators at a place midway along the length of the first and second collimator holders.

9. An optical isolator as recited in claim 7, wherein there are four solder joints holding each collimator holder within the housing tube.

10. An optical isolator as recited in claim 9, wherein at least one of the four solder joints that connects each of the collimators holders to the housing tube is made from low temperature solder.

11. An optical isolator as recited in claim 7, wherein the second collimator holder is aligned by adjusting the solder joints that affix the second collimator to the housing tube.

12. An optical isolator as recited in claim 7, wherein the first collimator holder has an outer diameter approximately equal to the inner diameter of the housing tube so that the first collimator holder fits snugly within the housing tube; and wherein the second collimator holder has an outer diameter substantially smaller than the inner diameter of the housing tube to permit alignment of the second collimator holder.

13. An optical isolator as recited in claim 12, wherein the second collimator holder is aligned by adjusting the solder joints that affix the second collimator holder to the housing tube.

14. An optical isolator as recited in claim 7, wherein the collimator holders affixed within the housing tube protrude from the ends of the housing tube; and wherein annular solder joints are made between the end of the housing tube and the protruding portions of the collimator holders.

15. An optical isolator as recited in claim 1, wherein the glass ferrule and GRIN lens of first and second collimators are pre-aligned to substantially lower the collimator insertion loss before being affixed-to the housing tube.

16. An optical isolator as recited in claim 1, wherein the first and second wedges and the optical rotator are pre-aligned to substantially lower insertion loss before being joined to the first collimator.

17. An optical isolator comprising:

a housing tube;

a first collimator, including a collimator holder, affixed within the housing tube, for receiving and collimating an optical signal from a first optical fiber;

a second collimator affixed within the housing tube, for receiving and collimating an optical signal from a second optical fiber; and a core assembly residing within the housing tube between the first collimator and second collimator, the core assembly being joined to the collimator holder of the first collimator and configured to pass substantially all the light received from the first collimator to the second collimator and pass substantially none of the light received from the second collimator to the first collimator;

wherein the core assembly includes:

a first birefringent wedge in alignment with the first collimator to receive a collimated light signal therefrom;

a second birefringent wedge in alignment with the second collimator to receive a collimated light signal therefrom, the second wedge having an optical axis rotated a predetermined angle with respect to an optical axis of the first wedge;

an optical rotator in alignment with the first and second wedges to receive light signals having orthogonal planes of polarization from the wedges, the optical rotator for rotating the plane of polarization of the light signals passing through the rotator and configured to have an angle of rotation that matches the predetermined angle of rotation of the optical axis of the second wedge; and a cylindrical permanent magnet that provides a magnetic field to the optical rotator, the cylindrical magnet having the first and second birefringent wedges and optical rotator disposed within, the cylindrical magnet being joined at one end directly to an end of the first collimator holder.

18. An optical isolator as recited in claim 17, wherein the optical rotator has a first face that receives light from the first wedge and a second face that receives light from the second wedge; and wherein the first wedge is joined to the first face of the optical rotator and the second wedge is joined to the second face of the optical rotator.

* * * * *